US010117166B2

(12) United States Patent
Hageltorn et al.

(10) Patent No.: US 10,117,166 B2
(45) Date of Patent: Oct. 30, 2018

(54) APPLICATION ASSISTED BAND SCANNING METHOD TO REDUCE NETWORK ACQUISITION TIME

(71) Applicant: BlackBerry Limited, Waterloo (CA)

(72) Inventors: Göran Hageltorn, Ottawa (CA); Jean-Philippe Paul Cormier, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/526,656

(22) Filed: Oct. 29, 2014

(65) Prior Publication Data
US 2016/0127983 A1 May 5, 2016

(51) Int. Cl.
*H04W 48/18* (2009.01)
*H04J 11/00* (2006.01)
*H04W 48/16* (2009.01)
*H04W 64/00* (2009.01)

(52) U.S. Cl.
CPC ......... *H04W 48/18* (2013.01); *H04J 11/0083* (2013.01); *H04W 48/16* (2013.01); *H04W 64/00* (2013.01)

(58) Field of Classification Search
CPC . H04W 48/18; H04W 64/006; H04W 84/042; H04W 88/06; H04J 11/0083
USPC ............ 455/456, 456.6, 456.1, 456.3, 550.1, 455/456.2
See application file for complete search history.

(56) References Cited

U.S. PATENT DOCUMENTS

| 7,437,158 | B2 | 10/2008 | Russell | |
|---|---|---|---|---|
| 7,458,184 | B2* | 12/2008 | Lohtia | H04W 4/14 455/412.1 |
| 8,812,029 | B1* | 8/2014 | Cao | H04M 1/72522 455/456.1 |
| 9,686,670 | B2* | 6/2017 | Ljung | H04W 48/16 |
| 2002/0082044 | A1 | 6/2002 | Davenport | |
| 2004/0181340 | A1 | 9/2004 | Smith | |
| 2005/0136949 | A1* | 6/2005 | Barnes, Jr. | G06Q 10/1053 455/461 |
| 2011/0264615 | A1* | 10/2011 | Rajan | H04L 67/18 706/47 |

(Continued)

FOREIGN PATENT DOCUMENTS

DE 10037474 A1 2/2002
EP 1703756 A1 9/2006

(Continued)

OTHER PUBLICATIONS

European Patent Office, Extended European Search Report on Application No. 15191958.6, dated Mar. 16, 2016.

(Continued)

*Primary Examiner* — Qutbuddin Ghulamali
(74) *Attorney, Agent, or Firm* — Moffat & Co

(57) ABSTRACT

A method of selecting a cellular network entails determining a current location of a mobile device by obtaining location data from an application on the mobile device, prioritizing cellular network frequency bands based on the current location to define a band priority, and selecting the cellular network based on the band priority. This method expedites selection of the cellular network when a mobile device is powered on, when its cellular radiofrequency transceiver is activated or when returning from an out-of-coverage area.

13 Claims, 7 Drawing Sheets

(56) References Cited

U.S. PATENT DOCUMENTS

| | | | | |
|---|---|---|---|---|
| 2012/0034917 A1* | 2/2012 | Kazmi | ............. | H04W 48/16 |
| | | | | 455/434 |
| 2013/0053074 A1* | 2/2013 | Sanchez | ............. | G01C 11/34 |
| | | | | 455/456.6 |
| 2013/0331127 A1* | 12/2013 | Sabatelli | ............. | H04W 4/021 |
| | | | | 455/456.3 |
| 2014/0113596 A1* | 4/2014 | Filev | ............. | G06Q 50/30 |
| | | | | 455/412.1 |

FOREIGN PATENT DOCUMENTS

| | | |
|---|---|---|
| EP | 1739991 A1 | 1/2007 |
| WO | 01/62034 A1 | 8/2001 |

OTHER PUBLICATIONS

European Patent Office, Communication from the Examining Division for Application No. 15 191 958.6, dated Nov. 22, 2017.
Machine Translation of DE10037474, German text published Feb. 14, 2002.
European Patent Office, Examination Department, Communication relating to Application No. 15 191 958.6-1214, dated Jun. 12, 2018.

* cited by examiner

APPLICATION ASSISTED BAND SCANNING METHOD TO REDUCE NETWORK ACQUISITION TIME

TECHNICAL FIELD

The present technology relates generally to wireless communications and, in particular, to cellular network selection techniques.

BACKGROUND

When a cellular radiofrequency transceiver of a mobile device is activated, the mobile device seeks to acquire a suitable wireless network in order to obtain voice and data services. Network selection algorithms enable the mobile device to find the optimal wireless network under various conditions.

In General Packet Radio Service (GPRS), Universal Mobile Telecommunication System (UMTS) and Long Term Evolution (LTE) systems, a public land mobile network (PLMN) list is normally used for the network selection. The PLMN list contains a list of networks specifying a mobile country code (MCC) and mobile network code (MNC) with a priority order. The PLMN list combined with access technology are typically stored in a subscriber identity module (SIM) or a universal subscriber identity module (USIM) card. The mobile device scans all the channels within cellular band groups until a suitable cellular network is found.

BRIEF DESCRIPTION OF THE DRAWINGS

Further features and advantages of the present technology will become apparent from the following detailed description, taken in combination with the appended drawings, in which.

It will be noted that throughout the appended drawings like features are identified by like reference numerals.

DETAILED DESCRIPTION

Figure 1:
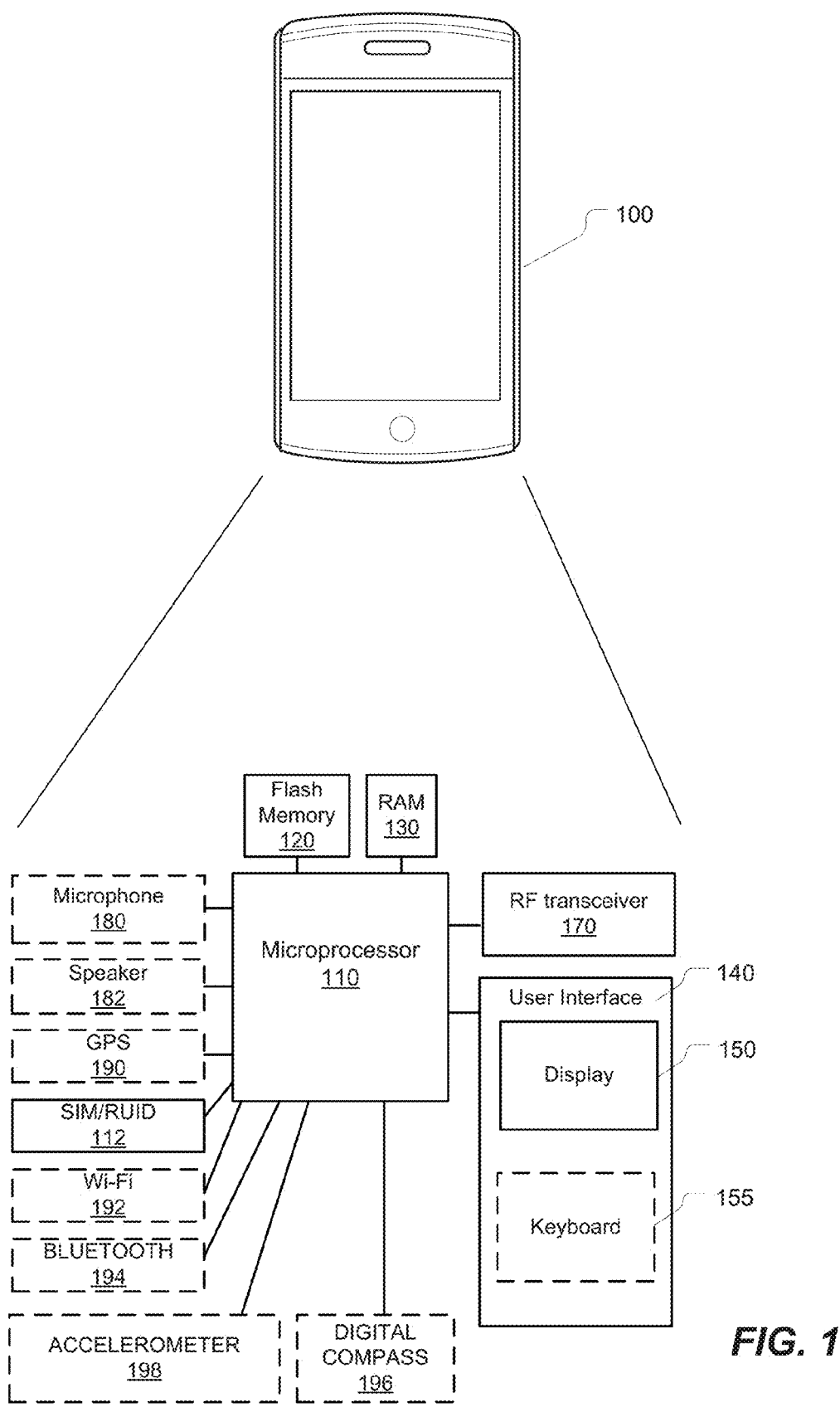
FIG. 1 is a depiction of a mobile device implementing the present technology.

On activation of a cellular radiofrequency transceiver of a mobile device, it is desirable for the network selection algorithm to find the optimal system quickly in order to prolong battery life and to provide a good user experience.

However, mobile devices today need to scan an ever-growing set of bands and radio access technologies (RATs). Currently, LTE uses 11 bands, UMTS uses 7 bands and GSM uses 4 bands. This scan can take a significant amount of time to complete while also depleting the battery. A technique to assist cellular network selection to reduce acquisition time is therefore highly desirable.

The present technology provides a technique for efficiently selecting a cellular network to reduce acquisition by using application location data already stored on the mobile device. The location data from the device application is then used to prioritize the cellular network frequency bands, thereby expediting the process of finding a desired cellular network when the mobile device is powered on, when a cellular radiofrequency transceiver of the mobile device is activated or when returning from an out-of-coverage area.

Accordingly, one aspect of the present technology is a method of selecting a cellular network. The method entails determining a current location of a mobile device by obtaining location data from an application on the mobile device, prioritizing cellular network frequency bands based on the current location to define a band priority, and selecting the cellular network based on the band priority.

Another aspect of the present technology is a non-transitory computer-readable medium comprising instructions in code which when loaded into a memory and executed by a processor of a mobile device cause the mobile device to determine a current location by obtaining location data from an application on the mobile device, prioritize cellular network frequency bands based on the current location to define a band priority, and select a cellular network based on the band priority.

Another aspect of the present technology is a mobile device that includes a cellular radiofrequency transceiver, a memory that stores an application and location data for the application, and a processor coupled to the memory and configured to determine a current location by obtaining the location data from the memory, prioritize cellular network frequency bands based on the current location to define a band priority, and select a cellular network based on the band priority.

The details and particulars of these aspects of the technology will now be described below, by way of example, with reference to the drawings.

In general, this technology may be implemented by a mobile device (i.e., a mobile communications device or wireless communications device) having a cellular radiofrequency transceiver as well as a memory storing location data for an application such as a calendar application, social media application or travel-booking application. The mobile device uses this location data to reorder (prioritize) its bands for more efficiently searching for a cellular network, thereby reducing acquisition time and battery drain.

FIG. 1 is a depiction of a mobile device implementing the present technology. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and may optionally include a keyboard or keypad. The user interface may also include an optical jog pad and/or a thumbwheel, trackball, track pad or equivalent.

As depicted by way of example in FIG. 1, the mobile device 100 includes a cellular radiofrequency (RF) transceiver 170. The cellular radiofrequency transceiver 170 enables wireless communication with one or more base stations over a cellular wireless network using cellular communication protocols and standards for both voice calls and packet data transfer such as GSM, CDMA, GPRS, EDGE, UMTS, LTE, etc.

The mobile device 100 may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 optionally includes a speech-recognition subsystem that has a microphone 180 for transforming voice input in the form of sound waves into an electrical signal. Optionally, the mobile device 100 may include a speaker 182 and/or an earphone jack.

The mobile device 100 may include a position-determining subsystem such as a Global Navigation Satellite System (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites. Although the present disclosure refers expressly to the Global Positioning System, it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The mobile device 100 optionally includes a Wi-Fi transceiver 192 for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification.

The mobile device 100 optionally includes a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or accelerometer 198. Other sensors may include a tilt sensor, gyro or equivalent.

The mobile device 100 may be a wireless communications device, tablet, personal digital assistant, cell phone, smart phone, smart watch, smart accessory, gaming device or any other portable electronic device that has a cellular transceiver as well as a processor and memory that execute at least one application having location data.

Figure 2:
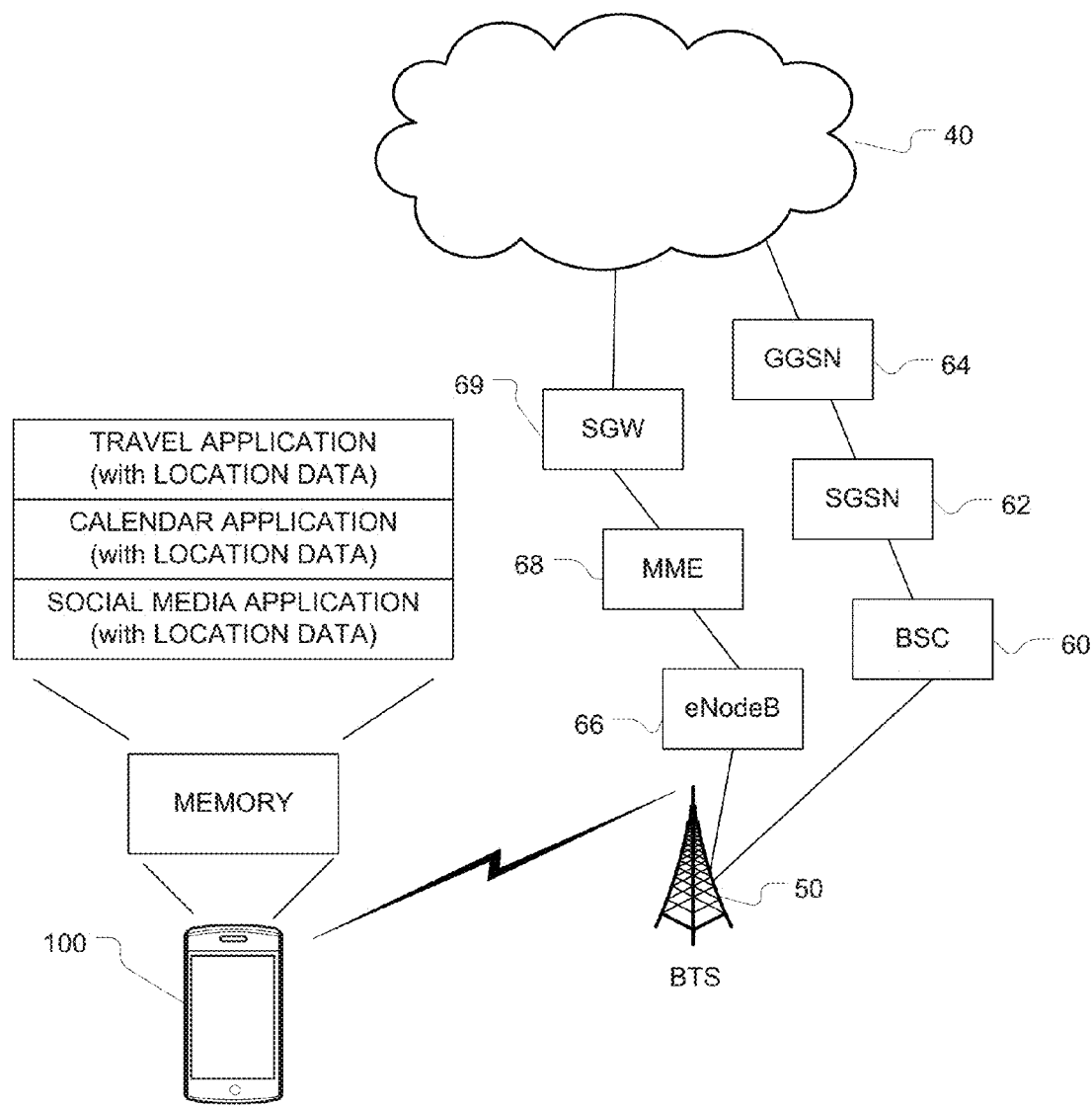
FIG. 2 is a depiction of a system implementing the present technology.

In the embodiment depicted by way of example in FIG. 2, the mobile device 100 stores in memory one or more device-executable applications such as a calendar application, social media application and travel application. Associated with each of these applications is a set of application data in the form of data files. Within these files are location data that can be identified as such and retrieved by the processor of the mobile device. The mobile device uses this location data to determines its current location. The cellular network frequency bands are then reordered or prioritized based on the current location to reduce network acquisition time. In other words, regardless of the technique used to obtain or estimate the mobile device's location, the mobile device uses the current location, however coarse, to reorder (prioritize) the cellular network frequency bands for more efficient searching. In prioritizing the cellular network frequency bands, the mobile device may create a set of prioritized bands or band priority. The set of prioritized bands may include all of the bands or a subset of the bands, if certain bands can be eliminated as being for other continents or other distant geographical regions. Once the desired cellular network is identified, the mobile device 100 connects to the cellular network via a base transceiver station (BTS) 50, base station controller (BSC) 60, Serving GPRS Support Node (SGSN) 62, and Gateway GPRS Support Node (GGSN) 64. In an LTE implementation, the mobile device connects via eNode B (base station) 66, mobility management entity (MME) 68 and serving gateway (SGW) 69.

Using this band-prioritization technology the mobile device expedites network selection (i.e. reduces acquisition time) and prolongs the battery life of the mobile device.

Figure 3:
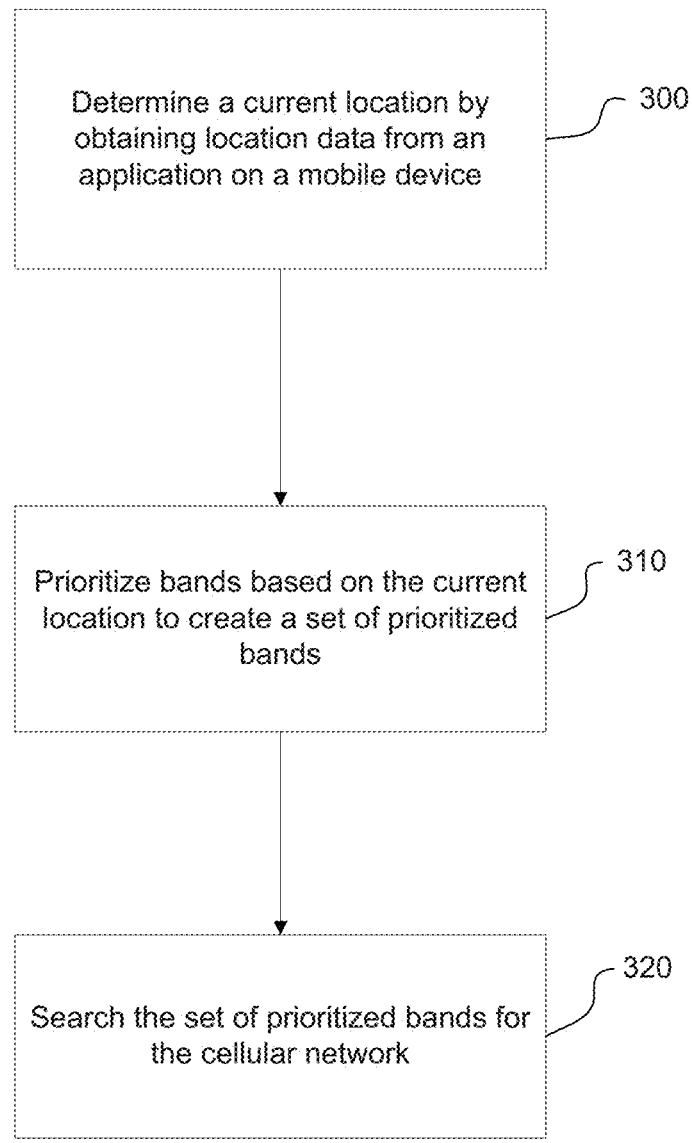
FIG. 3 is a flowchart outlining a method for selection of a cellular network using location information from an application.

A network-selection method is outlined by way of example in FIG. 3. As depicted in the flowchart of FIG. 3, the method entails steps, acts or operations of determining (300) a current location from an application on a mobile device, prioritizing (310) bands based on the current location to define a band priority, and selecting (320) a cellular network based on the band priority.

Each frequency band has an associated frequency range. For example, the RF transceiver chipset(s) of the mobile device may enable the mobile device to operate on one or more networks bands. For FD-LTE, these may be bands 1, 2, 3, 4, 5, 7, 8, 13, 17, 20 (i.e. on 2100/1900/1800/1700/850/2600/900/700/700/800 MHz, respectively), HSPA+ on bands 1, 2, 4, 5/6, 8 (i.e. 2100/1900/1700/850/900 MHz, respectively) and on quad-band GSM/GPRS/EDGE (850/900/1800/1900 MHz).

In one implementation, if scanning has already begun by the time the current location is determined, the current band scan continues for the band being scanned but the remaining bands are reordered so as to search local bands first. In another implementation, the device will search a PLMN list on activating a cellular radiofrequency transceiver and interrupt a search of the PLMN list only when the mobile device has determined the current location and the bands have been prioritized.

In this method, the mobile device exploits knowledge of its current location to expedite the network selection upon powering on the device ("power on") or on activating the cellular radio transceiver ("radio on"), which is especially useful when the user travels to a different geographic region. This technique will save device battery life and improve the user experience. In another embodiment, the activation of the cellular RF transceiver may occur when deactivating "Airplane Mode". In another embodiment, the activation of the cellular RF transceiver may be in response to a signal received from a Bedside Mode application. In another embodiment, the activation of the cellular radiofrequency transceiver may be in response to a signal received from a Child Mode application on the mobile device. In another embodiment, activation of the cellular radiofrequency transceiver may occur when the cellular RF transceiver is disabled for roaming and then enabled.

Figure 4:
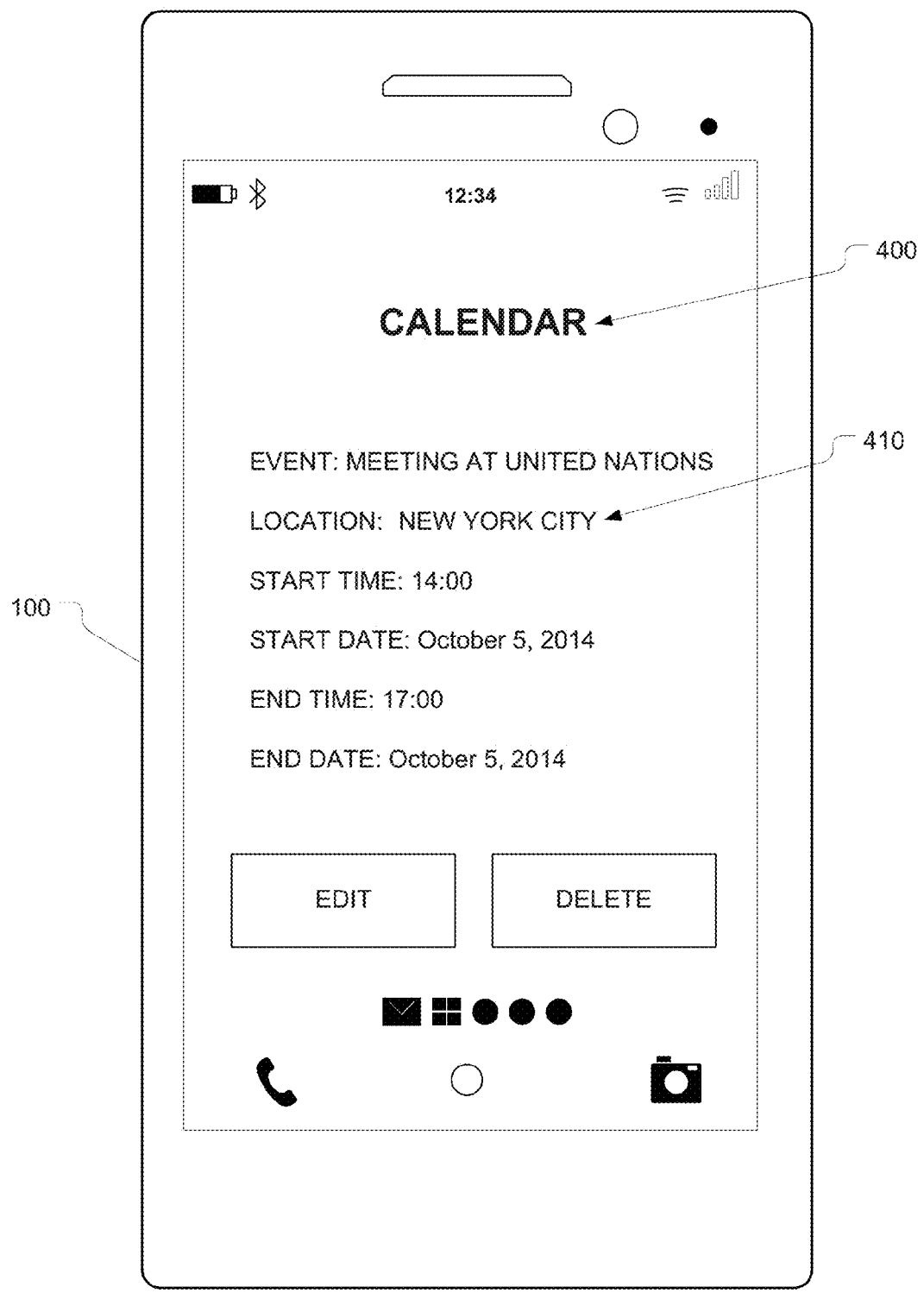
FIG. 4 is a depiction of a mobile device obtaining location information from a calendar application.

FIG. 4 is a depiction of a mobile device 100 obtaining the location from a calendar application 400. An entry in a calendar application (i.e. an electronic agenda or diary) for a meeting, appointment or event may indicate a location of the meeting, appointment or event. This event location may be used to determine the location of the mobile device for the purposes of reordering the frequency bands. As shown by way of example in FIG. 4, the calendar application stores an event and a location 410 such as a venue, address, or city, (e.g. New York City), etc. for the event. If the event day and event time correspond to the current day and current time, the event location may be used as the current location of the mobile device for the purposes of reordering the frequency bands. The degree of correspondence between the event day and time and the current day and time may vary to enable the device to use the location of an imminent or upcoming event as an approximation for the current location for the purposes of prioritizing the cellular network frequency bands.

Figure 5:
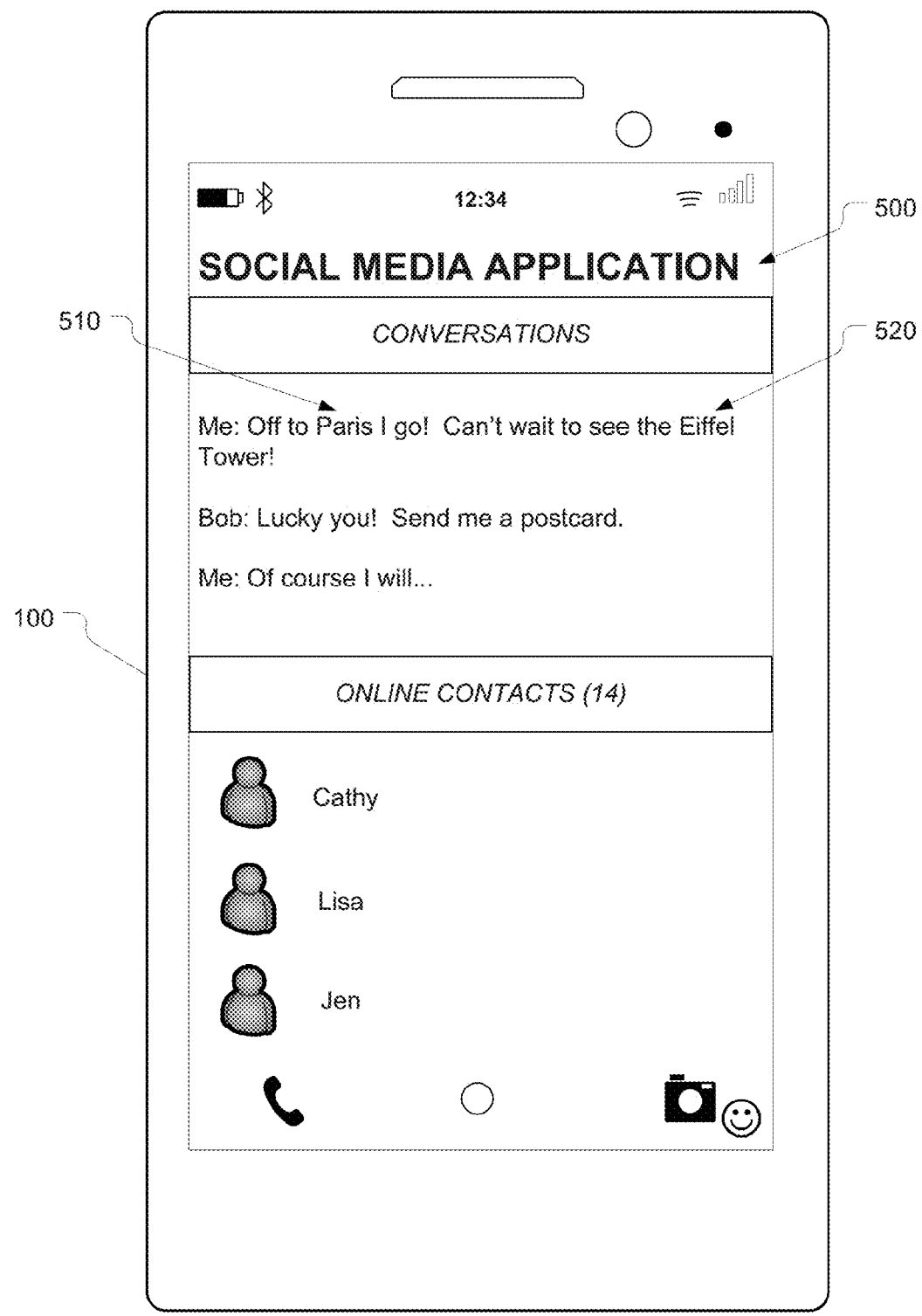
FIG. 5 is a depiction of a mobile device obtaining location information from a social media application.

FIG. 5 is a depiction of a mobile device 100 obtaining the location from a social media or social networking application or service 500 such as, for example, Facebook, Twitter, LinkedIn, Hootsuite, Tumblr, Wordpress, MySpace, or other suitable application. Alternatively, the mobile device may employ a web browser application to access a web-based social network from which the location information may be determined. Posts, tweets, messages, or other content may be used by the mobile device to determine where the mobile device is located. As shown by way of example, location data 510, 520 for the social media application is stored in memory of the mobile device. This location data is indicative of the current location of the mobile device or of an upcoming destination. The location data may specify a geographical entity such as a city 510, e.g. Paris, or it may specify a state, province, country, etc. Alternatively, the location data may specify a point of interest or a landmark, e.g. Eiffel Tower, from which the location may be determined or inferred. As another example, the mobile device may use a social media or social networking application or service such as Foursquare, Google+ or other suitable application or service to check-in to a location, such as a point of interest, e.g. Charles de Gaulle Airport. As a further example, the mobile device may use a social media or social networking application or service such as Facebook, Twitter, BlackBerry Messenger or other suitable application or service to post a status that includes location information, such as "Boarding my flight to Paris." As yet another example, the mobile device may use a social media or social networking application or service such as Instagram, Flickr, YouTube, Vine, or other suitable application or service to upload a photo or video or other media and tag or otherwise specify a location of the photo or video or other media.

Figure 6:
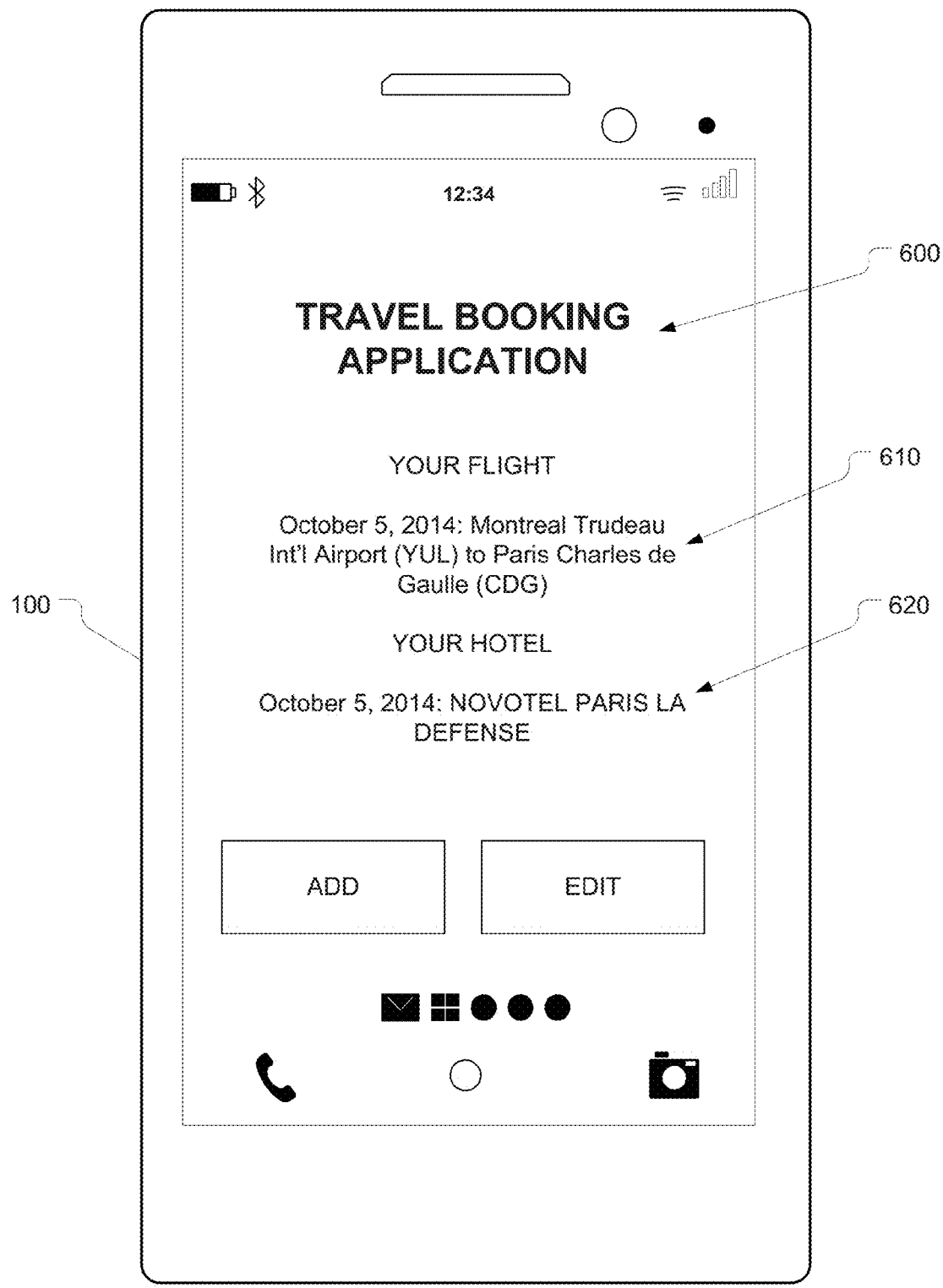
FIG. 6 is a depiction of a mobile device obtaining location information from a travel-booking application.

FIG. 6 is a depiction of a mobile device obtaining location information from a travel-booking application or a travel-management application or service 600. Alternatively, the mobile device may employ a web browser application to access a web-based travel service from which the location information may be determined. A travel-related application such as, for example, BlackBerry® Travel™, TripAdvisor, Expedia, Hotwire, Orbitz, Priceline, Kayak, Travelocity, Urbanspoon, OpenTable, Yelp, Uber, a loyalty or points application (such as Air Miles), an airline or rail application (such as United, American Airlines, Air Canada, British Airways, etc.), a travel guide application or other suitable application or web-based service may be consulted by the mobile device to determine the location of the mobile device. In the example depicted in FIG. 6, the travel app 600 stores airline ticket information 610 and hotel reservations 620 both of which indicate to the mobile device that the user is travelling to Paris from Montreal. As a further example, the mobile device may use a social media or social networking application or service such as OpenTable or other suitable application or service to make a dinner reservation at L'Atelier Saint-Germain de Joel Robuchon on Oct. 5, 2014 at 8:00 pm.

As a further example, the location information may be obtained from a weather application. The weather application may store a list of cities for which weather data is to be obtained. A recently added city may suggest an upcoming destination. Obtaining and displaying the weather for a particular city in the weather application may also be used as an indication of the location.

As yet a further example, the location information may be obtained from a clock application. The clock application may store times for different cities around the world. The device may detect that a particular city has been added or that the time zone has been selected for a given city or destination.

As another example, the location information may be obtained by an entertainment or sports application, e.g. Ticketmaster, Live Nation, StubHub. The location of the venue of a concert or sports event for which tickets have been purchased may be used to determine the location.

Figure 7:
FIG. 7 is a depiction of a mobile device obtaining location information by monitoring e-mail messages.

FIG. 7 is a depiction of a mobile device obtaining location information by monitoring textual content of messages sent and/or received by the mobile device. These messages may include e-mail messages, peer-to-peer messages, data messages, voice messages, or any other type of messages such as, for example, short message service (SMS), multimedia message service (MMS), instant messaging (IM), BlackBerry Messenger (BBM), personal identification number (PIN) messages or the like. The content of these messages may be parsed for travel-related content, e.g. names of cities, countries, destinations, etc. As shown by way of example in FIG. 7, an inbox 700 of a messaging application comprising an e-mail application contains messages from various senders. In some embodiments, the inbox 700 may comprise a unified inbox that aggregates different types of messages, such as any of the following: e-mail messages, text messages, SMS messages, MMS messages, PIN messages, Instant Messages, voice messages, Facebook messages, Twitter direct messages, LinkedIn messages, and other messages. The mobile device may parse these messages to search for locations or destinations. In this example, the mobile device identifies the destination "Punta Cana". The mobile device then determines that an imminent destination will be Punta Cana in the Dominican Republic. As another example, the mobile device may parse the messages for travel booking information, such as by parsing an e-mail message that includes an e-ticket for a flight or a flight itinerary. An instant messaging application or service may also be mined or monitored to extract location information. Examples of instant messaging applications and services include BBM, WhatsApp, Kik, Skype, Facebook Messenger, Yahoo Messenger, MSN Messenger, AIM (AOL Instant Messenger). For example, a user may post a BBM status as "Flight from Montreal to Paris" from which the device may determine the location.

The location may also be obtained by monitoring web usage, i.e. by observing user behavior with respect to a web browser, e.g. web sites visited, especially travel sites, search terms input into a search engine, maps consulted, reviews consulted, reservations made, etc. By mining or monitoring the web content rendered by the mobile device, the mobile device may be able to determine the destination of the user of the mobile device which would therefore, in some cases, permit the mobile device to reorder the bands based on the determined destination of the mobile device.

It will be appreciated that the method is not restricted to cases where the device is powered on or the cellular radio is activated. This method may also apply to other cases, for example, when the mobile device is out of coverage for a long period of time and user may travel to a different geographic region during this period.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

It is to be understood that the singular forms "a," "an," and "the" include plural referents unless the context clearly dictates otherwise. Thus, for example, reference to "a processor" includes reference to one or more of such processors.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of selecting a cellular network, the method comprising:
   scanning frequency bands according to a delimit order;
   determining, at a mobile device, a current location of the mobile device by obtaining location data from messages sent to or from contacts of a user of the mobile device;
   prioritizing cellular network frequency bands based on the current location to define a band priority;
   responsive to the prioritizing being complete, interrupting the scanning; and
   resuming the scanning of the frequency bands according to the band priority;
   wherein the determining comprises parsing text of the messages for place names.

2. The method as claimed in claim 1 wherein determining the current location is based on data from a social media application.

3. The method as claimed in claim 1 wherein determining the current location is based on data from a web browser application.

4. The method as claimed in claim 1 wherein determining the current location comprises mining said messages for travel-related location data.

5. The method as claimed in claim 1 wherein the determining of the current location is performed in response to activating a cellular radiofrequency transceiver.

6. A non-transitory computer-readable medium comprising instructions in code which when loaded into a memory and executed by a processor of a mobile device cause the mobile device to:
   scan frequency bands according to a default order;
   determine a current location of the mobile device by obtaining location data from messages sent to or from contacts of a user of the mobile device;
   prioritize cellular network frequency bands based on the current location to define a band priority;
   responsive to the prioritizing being complete, interrupt the scanning; and
   resume the scanning of the frequency bands according to the band priority;
   wherein the determining comprises parsing text of the messages for place names.

7. The non-transitory computer-readable medium as claimed in claim 6 wherein the current location is based on data from a social media application.

8. The computer-readable medium as claimed in claim 6 wherein the current location is based on data from a web browser application.

9. The non-transitory computer-readable medium as claimed in claim 6 wherein the mobile device determines the current location in response to activating a cellular radiofrequency transceiver.

10. A mobile device comprising:
    a cellular radiofrequency transceiver;
    a memory that stores an application and data for the application; and
    a processor coupled to the memory and configured to:
    scan frequency bands according to a default order;
    determine a current location of the mobile device by obtaining location data from contacts of a user of the mobile device;
    prioritize cellular network frequency bands to define a band priority;
    responsive to the prioritizing being complete, interrupt the scanning;
    resume the scanning of the frequency bands according to the band priority;
    wherein the determining comprises parsing text of the messages for place names.

11. The mobile device as claimed in claim 10 wherein the current location is based on data from a social media application.

12. The mobile device as claimed in claim 10 wherein the current location is based on travel-related location data mined from said messages.

13. The mobile device as claimed in claim 10 wherein the processor determines the current location in response to activating the cellular radiofrequency transceiver.

* * * * *